United States Patent
Cavelius et al.

(10) Patent No.: US 11,678,743 B2
(45) Date of Patent: Jun. 20, 2023

(54) STACKING STORAGE ARRANGEMENT

(71) Applicant: Jungheinrich Aktiengesellschaft, Hamburg (DE)

(72) Inventors: Jörg Cavelius, Bad Vilbel (DE); Michael Becker, Hainburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 371 days.

(21) Appl. No.: 16/998,591

(22) Filed: Aug. 20, 2020

(65) Prior Publication Data
US 2021/0052070 A1    Feb. 25, 2021

(30) Foreign Application Priority Data

Aug. 23, 2019   (EP) ..................................... 19193380

(51) Int. Cl.
*A47B 87/02*   (2006.01)
*B65G 1/02*    (2006.01)

(52) U.S. Cl.
CPC ...... *A47B 87/0261* (2013.01); *A47B 87/0246* (2013.01); *B65G 1/02* (2013.01)

(58) Field of Classification Search
CPC .......... B65G 1/0471; B65G 1/14; B65G 1/02; B65G 57/302; B65G 57/30; B65G 57/02; B65G 59/063; B65G 59/062; A47B 87/0246; A47B 87/0261
See application file for complete search history.

(56) References Cited

U.S. PATENT DOCUMENTS

| | | | | |
|---|---|---|---|---|
| 3,231,103 A | * | 1/1966 | Tantlinger | ................ B65G 1/14 211/49.1 |
| 3,734,312 A | * | 5/1973 | Hickinbotham | ..... B65G 1/0442 414/281 |
| 4,712,691 A | * | 12/1987 | Grill | ........................ B65G 1/14 211/49.1 |
| 5,005,712 A | * | 4/1991 | Niederprum | ............. B65G 1/14 53/244 |

(Continued)

FOREIGN PATENT DOCUMENTS

| | | |
|---|---|---|
| DE | 29521393 U1 | 2/1997 |
| DE | 102013009340 A1 | 12/2014 |

(Continued)

OTHER PUBLICATIONS

EP Search Report from Application No. 19193380.3-1017, dated Feb. 21, 2020.

*Primary Examiner* — Patrick D Hawn
(74) *Attorney, Agent, or Firm* — Greenblum & Bernstein, P.L.C.

(57) ABSTRACT

A stacking storage arrangement is specified, comprising a rack having multiple container receiving spaces that each have an opening at the bottom end thereof, wherein at at least one opening a latch arrangement is arranged which comprises at least one latch unit having a holding latch that can be moved between a locking position and a release position. An objective is to be able to operate a stacking storage arrangement of this type in an economical manner. For this purpose, the holding latch is configured to be replaced from the inner side of the opening.

14 Claims, 2 Drawing Sheets

(56) References Cited

U.S. PATENT DOCUMENTS

| | | | | |
|---|---|---|---|---|
| 6,663,148 | B2* | 12/2003 | Bonora | H01L 21/67373 |
| | | | | 292/159 |
| 8,118,531 | B2* | 2/2012 | Watanabe | H05K 13/0439 |
| | | | | 269/254 CS |
| 10,059,521 | B2* | 8/2018 | Swoboda | B65G 59/101 |
| 10,240,408 | B2* | 3/2019 | Finlay | G01R 33/072 |
| 11,111,078 | B2* | 9/2021 | Laible | B65G 1/14 |
| 11,235,927 | B2* | 2/2022 | Hognaland | B65G 1/0478 |
| 11,261,026 | B2* | 3/2022 | Cavelius | B65G 57/02 |
| 2003/0206789 | A1* | 11/2003 | Tai | B65G 1/0414 |
| | | | | 414/275 |
| 2014/0308107 | A1* | 10/2014 | Nickles | B65G 57/302 |
| | | | | 29/418 |
| 2021/0052071 | A1* | 2/2021 | Cavelius | B65G 1/02 |
| 2021/0053777 | A1* | 2/2021 | Harting | B65G 1/0471 |
| 2022/0063916 | A1* | 3/2022 | Becker | B65G 57/302 |

FOREIGN PATENT DOCUMENTS

| | | |
|---|---|---|
| EP | 2982624 B1 | 10/2017 |
| NO | 20171688 A1 | 4/2019 |
| WO | WO9631420 A1 | 10/1996 |
| WO | WO2010097425 A1 | 9/2010 |

* cited by examiner

STACKING STORAGE ARRANGEMENT

CROSS-REFERENCE TO RELATED APPLICATIONS

The present application claims priority under 35 U.S.C. § 119 of European Patent Application No. EP 19193380.3, filed Aug. 23, 2019, the disclosure of which is expressly incorporated by reference herein in its entirety.

BACKGROUND

1. Field of the Invention

The present invention relates to a stacking storage arrangement which comprises a rack having multiple container receiving spaces that each have an opening at the bottom end thereof, wherein at at least one opening a latch arrangement is arranged which comprises at least one latch unit having a holding latch that can be moved between a locking position and a release position.

2. Discussion of Background Information

A stacking storage arrangement of this type is known from EP 2 982 624 B 1, for example.

In a stacking storage arrangement of this type, containers can be stored which are stacked on top of one another and thus form a stack. The stacks can be arranged such that they are relatively closely adjacent to one another, for example in the form of a matrix with rows and columns.

In principle, a container can either be introduced into the stack from above and also be removed at the top, or it can be introduced into the stack from below and also be removed from below. In the present stacking storage arrangement, the container is placed into storage from below and is also removed from below.

To accomplish this, a loading space is provided below the container receiving spaces, in which loading space a loading vehicle can move. The loading vehicle can, if it is for example loaded with a container outside of the stacking storage arrangement, transport this container to a predetermined stack, lift the container there unit it comes into contact with the bottommost container of that stack, and then lift the container with the stack resting thereon. This lifting takes place until the container being newly placed into storage has moved past the latch arrangement. The latch arrangement can thereby be opened by the container being placed into storage. If the container being placed into storage, along with the stack of additional containers resting thereon, is lowered again, then the holding latches snap into place on the container and hold the container, with the stack of other containers resting thereon, at the desired distance from the flooring or another contact surface so that the loading space can be kept free of containers.

The holding latches are a replacement part or a service part. At the same time, they are functionally essential elements. Accordingly, it is important for an economical operation of the stacking storage arrangement that service times can be kept short.

SUMMARY

Embodiments of the invention are directed to keeping times for servicing and maintenance short.

Keeping such times short is attained with a stacking storage arrangement of the type mentioned above by being able replace the holding latch from the inner side of the opening.

Thus, only one point of access to the opening is necessary if a replacement of the holding latch should be necessary. It is not necessary to disassemble larger parts of the stacking storage arrangement. Each container receiving space can be serviced and maintained separately from other container receiving spaces.

Preferably, the holding latch is arranged in a bracket element that is detachably secured in the rack. Here, a holding latch unit is used in which the holding latch is arranged in a bracket element. This unit can be replaced easily in the event of damage or during servicing. A replacement of this type can take place within a relatively short time, so that the servicing or maintenance of the stacking storage arrangement can be carried out in this region relatively quickly in each case.

Preferably, the opening comprises two longitudinal sides and two transverse sides, and the holding latch can be pivoted about an axis that forms an angle of less than 90° both with a longitudinal side and also with a transverse side. Preferably, the axis respectively forms an angle of roughly 45° with both sides, that is, with the longitudinal side and the transverse side. The holding latch thus acts from a corner into the opening. If a container is brought into the container receiving space through the opening, then the holding latch acts on a corner of the container. A container normally has the greatest stability in the corner. Accordingly, the load bearing capacity of the container is rendered large, so that a greater amount of additional containers can be stacked above the bottommost container.

Preferably, the axis is positioned on two supporting flanges running perpendicular to the axis. This facilitates the production of the bracket element. The supporting flanges can be decoupled from regions with which the bracket element is secured in the rack.

Preferably, the opening is embodied in a frame that forms a part of the rack, wherein the bracket element is arranged in a notch in the frame. The bracket element can then be braced in the frame, which results in a high mechanical stability. In addition, assembly space can be saved because the bracket element can be at least partially countersunk in the frame.

Preferably, the notch is embodied as a pass-through opening. The bracket element can thus be hidden in the notch to a large extent, without the frame needing to be embodied with an excessively large wall thickness.

In a preferred embodiment, the bracket element is embodied as an angled element which comprises a first leg that is aligned parallel to one side of the opening and a second leg that is aligned parallel to another side connecting to this side. Thus, the bracket element can be arranged in the corner of the opening and the two legs can be mounted parallel to the edge of the opening.

Preferably, the bracket element is accessible from the interior of the opening. If a repair is necessary, the bracket element can simply be removed from the inner side of the opening, and another bracket element with a holding latch attached thereto can be inserted. This facilitates repairs.

Preferably, the bracket element is connected to an inner side of the opening. This connection can be released from the inner side of the opening so that work is only required below a single container receiving space. An intervention from regions below other container receiving spaces is not necessary, however.

Preferably, the holding latch is embodied as a two-armed lever having a first arm that is directed into the opening and a second arm that is directed away from the opening, wherein in the bracket element a stop is provided which the second arm strikes when the first arm forms an angle in the range of negative 15° to positive 15° to the horizontal. The first arm can thus protrude relatively far into the opening in order to hold a container. The second arm extends to the first arm in a preferably straight manner, which facilitates production of the holding latch.

Preferably, the stop is formed by a wall section of the bracket element. An additional element is not required, which renders production cost-effective.

Preferably, the holding latch is connected to a rotational spring arrangement that applies a force to the second arm of the holding latch in the direction of the stop. It is thus ensured that the holding latch, if no other forces are present, is always pivoted into a holding position in which it can support a container.

Preferably, the holding latch comprises a part of a sensor arrangement with which a position of the holding latch can be acquired. It can then be determined in a relatively simple manner whether the holding latch is located in the holding or locking position in which it secures a container against moving farther downward. Should the sensor arrangement determine that this is not the case, then a further lowering of a container can be stopped, for example, in order to prevent a dangerous situation.

Preferably, the part of the sensor arrangement is embodied as a reflector. A part of the sensor arrangement can then, for example, direct a beam of light into the region in which the reflector is arranged when the holding latch is in the holding or locking position. The reflector then reflects the beam of light back to the receiver. If the receiver acquires the reflected beam of light, the sensor arrangement can determine that the holding latch has been pivoted into the holding or locking position. If the receiver does not acquire the beam of light, this is an indication that the holding latch is not in the desired position.

Preferably, the bracket element is embodied as a cast part. A cast part can be produced cost-effectively and, at the same time, has the required mechanical stability.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
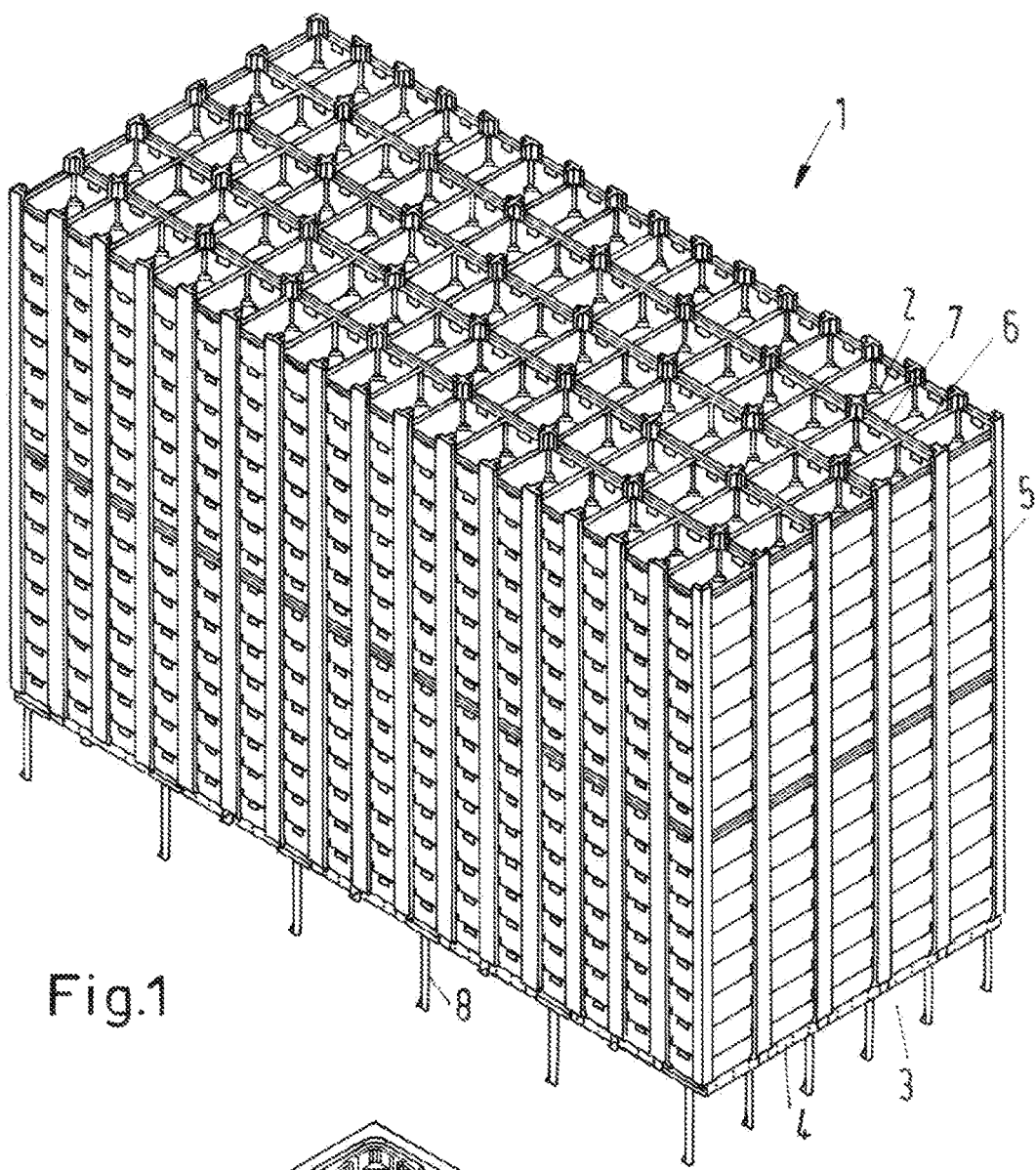
FIG. 1 shows a schematic illustration of a stacking storage arrangement.

FIG. 1 shows, in a schematic illustration, a stacking storage system 1 in which a plurality of containers 2 is arranged. The containers 2 are arranged in stacks in the form of a matrix with rows and columns. In the present exemplary embodiment, five stacks are arranged next to one another and sixteen stacks behind one another. Below the stacks of containers 2, a loading space 3 is arranged through which containers can be placed into storage in the stacking storage arrangement 1 and can be removed from the stacking storage arrangement 1.

The containers 2 are arranged in container receiving spaces. Between the loading space 3 and the container receiving spaces, a frame 4 is arranged. The frame 4 forms a part of a rack. The rack furthermore comprises uprights 5 that can be connected to one another by transverse braces 6 and longitudinal braces 7. The frame 4 is supported on the flooring or another contact surface via supports 8.

In the present case, the frame 4 is composed of a plurality of modules 9 that can be connected to one another in a longitudinal direction and in a transverse direction of the stacking storage arrangement 1, for example, using screws or rivets. Each module forms an opening 19 through which a container 2 can be introduced into a container receiving space or removed from the container receiving space.

Figure 2:
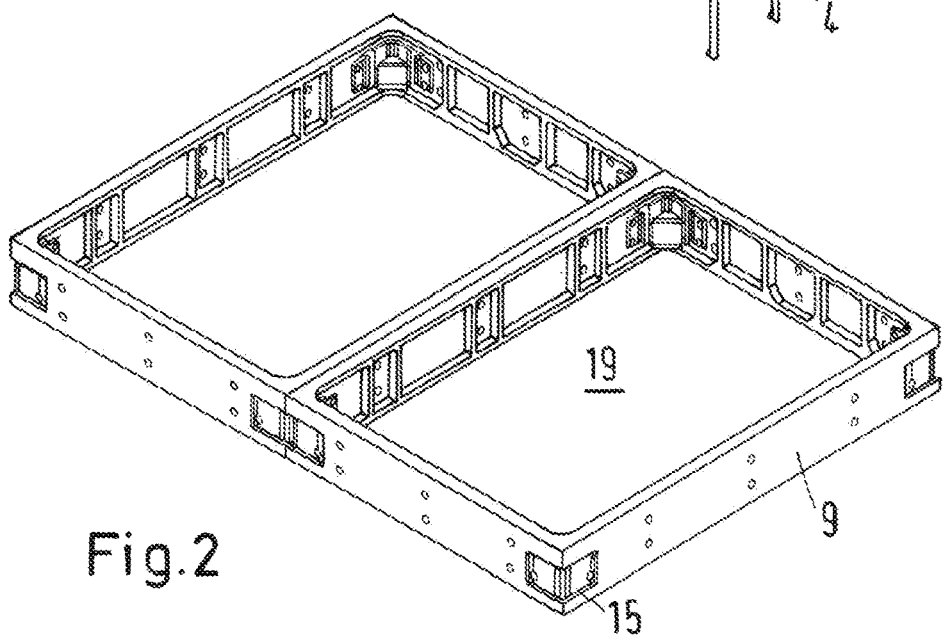
FIG. 2 shows a detail from a frame.

FIG. 2 shows two modules 9 of this type, each of which comprises an opening 19. However, it is also possible to use modules that comprise more than one opening 19. Modules with two, three, four, or five openings are thus possible, for example. The modules 9 are preferably embodied as cast parts.

Figure 3:
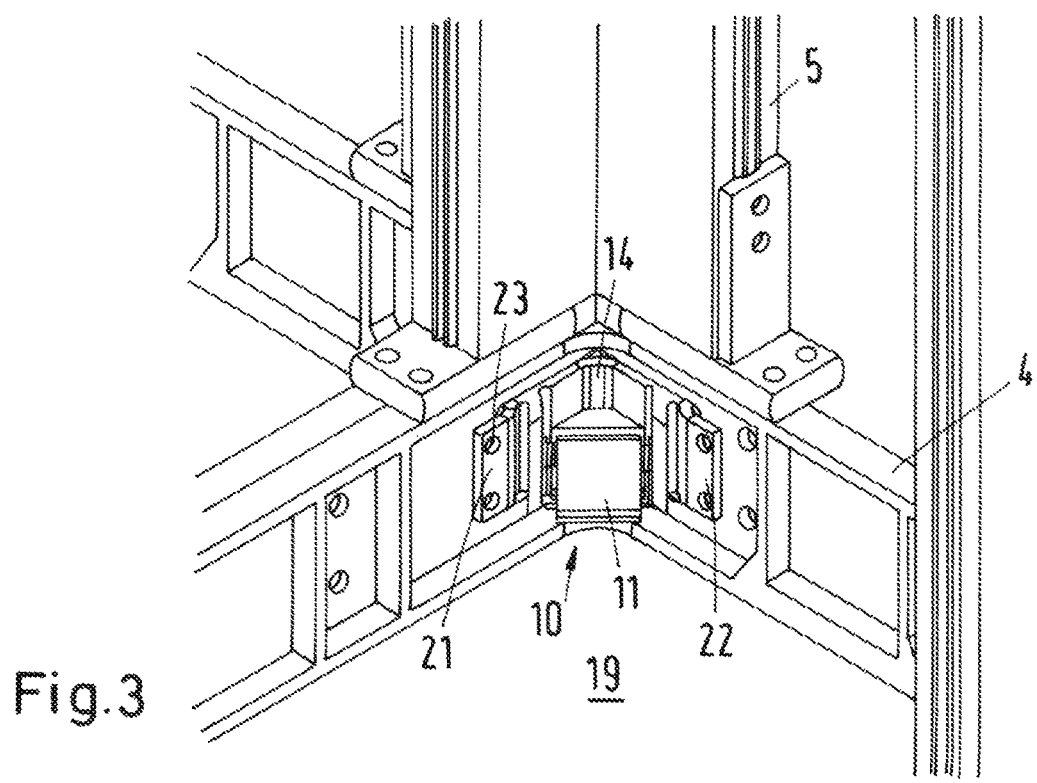
FIG. 3 shows a detail from the stacking storage arrangement with a latch unit.

FIG. 3 shows a part of a module 9 with uprights 5 located thereon. FIG. 3 furthermore shows a latch unit 10 that is illustrated in an enlarged manner in FIGS. 4 through 6.

Figure 4:
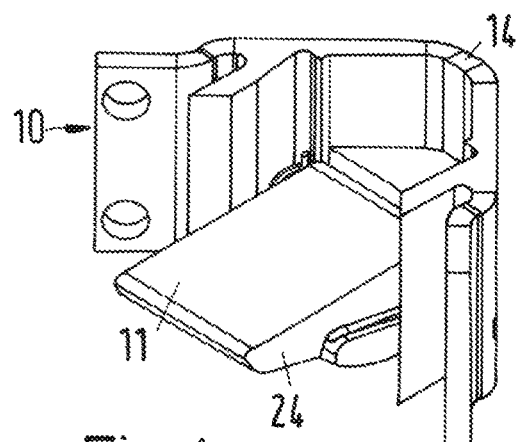
FIG. 4 shows the latch unit with a holding latch in the holding or locking position.
Figure 5:
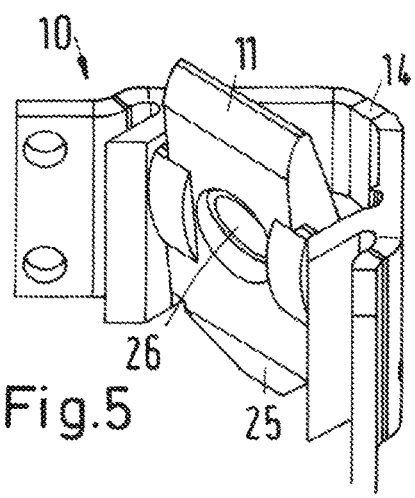
FIG. 5 shows the latch unit with a holding latch in the release position.

The latch unit 10 comprises a holding latch 11 that can be moved between a locking position illustrated in FIG. 4 and a release position illustrated in FIG. 5. The movement of the holding latch 11 occurs by a pivoting about an axis 12 that is indicated by a dot-dashed line in FIG. 6. Two springs 13, preferably rotational springs or torsion springs, are provided in order to load the holding latch 11 with a force or a torque in the direction of the locking position. Preferably, the center of gravity of the holding latch 11 is arranged such that a movement into the locking position automatically occurs by means of gravity.

The latch unit comprises a bracket element 14 on which the holding latch 11 is pivotably arranged. The bracket element 14 is arranged detachably in the rack, more precisely in the frame, namely on the inner side of the opening 19. The bracket element 14 and therefore the latch unit 10 can thus be mounted or replaced from the inner side of the opening 19.

The bracket element 14 is mounted in a notch 15 in the frame. The notch 15 is embodied as a pass-through opening in the frame. As can be seen in FIG. 2, the notch 15 is embodied as a pass-through opening in the module 9. The bracket element 14 can thus be countersunk to a large extent in the frame, in the present case in the module 9, and projects only slightly out of the frame.

Figure 6:
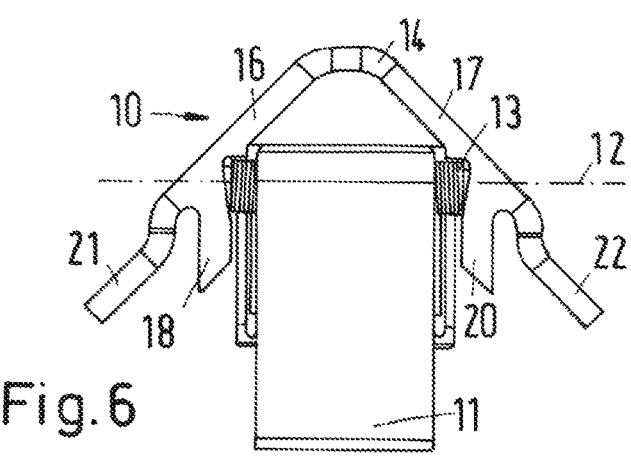
FIG. 6 shows the latch unit in a top view.

As can be seen in particular in FIGS. 4 through 6, the bracket element 14 is embodied as an angled element which comprises two legs, namely a first leg 16 that is aligned parallel to one side of the opening 19 and a second leg 17 that is aligned parallel to another side of the opening 19 connecting to this side. The two legs 16, 17 form an angle of roughly 90°.

From the legs 16, 17, two supporting flanges 18, 20 protrude into the opening 19. The supporting flanges 18, 20 run essentially parallel to the longitudinal extension of the holding latch 11. The holding latch 11 is pivotably mounted in the supporting flanges 18, 20. The supporting flanges 18, 20 run perpendicular to the axis 12.

The first leg 16 comprises a first attachment region 21 and the second leg 17 comprises a second attachment region 22. The attachment regions 21, 22 bear against the frame, in the present case against the module 9, from the inside. The attachment regions 21, 22 comprise bores 23 through which threaded bolts can be guided in order to attach the bracket element 14 to the frame. The bracket element is thus connected to the inner side of the opening 19.

The holding latch 11 is embodied as a two-armed lever having a first arm 24 that is directed into the opening 19 and a second arm 25 that is directed away from the opening 19. On the bracket element 14, a stop is provided which the second arm 25 strikes when the first arm 24, more precisely the upper side of the first arm 24 in the direction of gravity, forms an angle in the range of negative 15° to positive 15° to the horizontal. It is thus achieved that the holding latch protrudes as far as possible into the opening 19 in the locking or holding position (FIG. 4) and a container 2 that is held by the holding latches 11 in the four corners of the opening 19 can be reliably held independent of the exact alignment thereof in the opening 19.

The stop is formed by the bracket element 14, which for this purpose can comprise on the bottom side thereof a recess that is not illustrated in greater detail.

On the bottom side of the first arm 24, a reflector 26 is arranged. The reflector 26 forms a part of a sensor arrangement, which is otherwise not illustrated in greater detail, with which a position of the holding latch 11 can be acquired. The sensor arrangement can, for example, be provided with a light source, the beam of which is directed upward. If the holding latch 11 is located in the locking position, then light is reflected back into the proximity of the light source again and can be acquired there. If this is the case, it is an indication that the holding latch 11 is located in the locking position. If this is not the case, it indicates that the holding latch 11 is not located in the locking position and, accordingly, cannot reliably hold a container. In this case, the sensor arrangement can transmit an appropriate signal to a control device, which then on the one hand triggers a malfunction message or error message and on the other hand prevents a container or a container stack from being lowered further.

The remaining part of the sensor arrangement can be arranged in the rack. However, it is also possible to arrange additional elements of the sensor arrangement on a loading vehicle with which a container can be driven into the stacking storage arrangement or removed from the stacking storage arrangement.

The bracket element 14 is preferably embodied as a cast part. It can be produced cost-effectively and requires only a slight effort for finishing.

The container does not necessarily need to be closed on all sides. It can also comprise openings, provided that it is stackable.

The foregoing examples have been provided merely for the purpose of explanation and are in no way to be construed as limiting of the present invention. While the present invention has been described with reference to an exemplary embodiment, it is to be understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A stacking storage arrangement comprising:
a rack having multiple container receiving spaces, each of the multiple container receiving spaces having an opening at a bottom end thereof;
a loading space located below the multiple container receiving spaces, and the rack comprising a frame arranged between the multiple container receiving spaces and the loading space;
a latch arrangement arranged at at least one opening, said latch arrangement comprising at least one latch unit having a holding latch;
said holding latch being configured to be moved movable between a locking position and a release position; and
said holding latch being configured to be replaced from an inner side of the at least one opening,
wherein the holding latch is arranged in a bracket element that is configured to be detachably secured in the rack,
wherein the at least one opening is embodied in the frame,
wherein the bracket element is arranged in a notch of the frame, and
wherein the holding latch is configured to hold a stack of containers in a corresponding container receiving space.

2. The stacking storage arrangement according to claim 1, wherein the opening comprises two longitudinal sides and two transverse sides, and the holding latch is configured to be pivoted about an axis that forms an angle of less than 90° both with a longitudinal side and with a transverse side.

3. The stacking storage arrangement according to claim 2, wherein the axis is positioned on two supporting flanges running perpendicular to the axis.

4. The stacking storage arrangement according to claim 1, wherein the notch is embodied as a pass-through opening.

5. The stacking storage arrangement according to claim 1, wherein the bracket element is embodied as an angled element that comprises a first leg that is aligned parallel to one side of the opening and a second leg that is aligned parallel to another side of the opening, the another side being connected to the one side.

6. The stacking storage arrangement according to claim 1, wherein the bracket element is accessible from an interior of the opening.

7. The stacking storage arrangement according to claim 6, wherein the bracket element is connected to an inner side of the opening.

8. The stacking storage arrangement according to claim 1, wherein the holding latch is embodied as a two-armed lever having a first arm directed into the opening and a second arm directed away from the opening, and wherein on the bracket element a stop is provided that the second arm is configured to strike when the first arm forms an angle in a range of −15° to +15° to horizontal.

9. The stacking storage arrangement according to claim 8, wherein the stop is formed by a wall section of the bracket element.

10. The stacking storage arrangement according to claim 8, wherein the holding latch is connected to a rotational spring arrangement that is configured to apply a force to the second arm of the holding latch in a direction of the stop.

11. The stacking storage arrangement according to claim 1, wherein the holding latch comprises a part of a sensor arrangement with which a position of the holding latch can be acquired.

12. The stacking storage arrangement according to claim 11, wherein the part of the sensor arrangement is embodied as a reflector.

13. The stacking storage arrangement according to claim 1, wherein the bracket element is embodied as a cast part.

14. A stacking storage arrangement comprising:
a rack having multiple container receiving spaces, each of the multiple container receiving spaces having an opening at a bottom end thereof;
a latch arrangement arranged at at least one opening, said latch arrangement comprising at least one latch unit having a holding latch;
said holding latch being configured to be movable between a locking position and a release position; and
said holding latch being configured to be replaced from an inner side of the at least one opening,
wherein the holding latch is arranged in a bracket element that is configured to be detachably secured in the rack,
wherein the at least one opening is embodied in a frame that forms a part of the rack,
wherein the bracket element is arranged in a notch of the frame, and
wherein the at least one opening comprises two longitudinal sides and two transverse sides, and the holding latch is configured to be pivoted about an axis that forms an angle of less than 90° both with a longitudinal side and with a transverse side.

* * * * *